Sept. 8, 1959  A. S. COLLINS  2,903,340
RECOVERY OF ACIDS FROM PETROLEUM SLUDGES
Filed Sept. 25, 1956
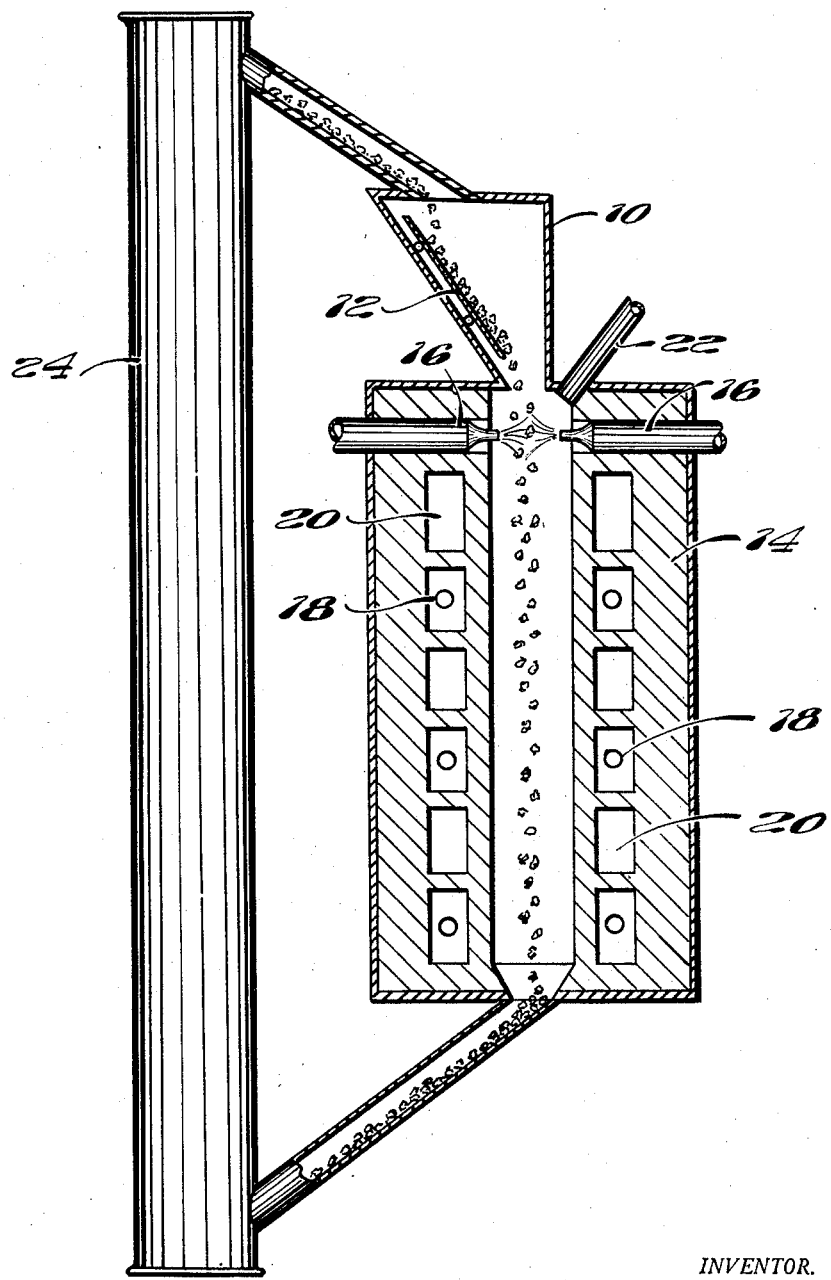
INVENTOR.
ARTHUR S. COLLINS
BY

2,903,340
RECOVERY OF ACIDS FROM PETROLEUM SLUDGES

Arthur S. Collins, Dedham, Mass., assignor to Godfrey L. Cabot, Inc., Boston, Mass., a corporation of Massachusetts Application September 25, 1956, Serial No. 611,900

5 Claims. (Cl. 23—177)

This invention relates to a process for recovering sulfur values from acid sludges formed during the treatment of various hydrocarbons with sulfuric acid. More particularly it is directed to an improved and more practical method of carrying out said recovery by thermally decomposing the sulfuric acid directly from the sludge.

Various methods have been used to recover sulfur values from hydrocarbon-containing sulfuric acid residues or sludges. However, for the last 20 years or more the approach most favored by industry has generally involved decomposition of the sulfuric acid directly from the sludge followed by recovery of $SO_2$ or other sulfur values from the gaseous decomposition products.

Many different techniques have been employed in attempting to effect maximum recovery of the sulfur values from the sludge while, at the same time, obtaining as high a concentration of $SO_2$ as possible in the evolved stream of gaseous decomposition products. The majority of the processes which have evolved from such efforts are based upon the use of a granular solid which serves as a carrier for the sludge during the thermal treatment leading to decomposition thereof. The tendency of acid sludges, particularly those of relatively high oil content, to foam when heated to decomposition temperatures, particularly when in contact with such granular solids, has been a persistent problem throughout the entire process development in this field and is one to which a completely satisfactory solution has never been found.

Several remedial measures have, of course, been proposed to counteract said foaming problem. However, these previous remedies have, without exception, introduced additional drawbacks to the process such as additional precautionary steps or limiting conditions the net result of which has actually been to decrease operating efficiency and to increase the overall complexity of the operation and the total processing costs.

For example, Barnes et al. in U.S. 2,223,934 suggests the use of a special type of rotary furnace in which a bed of granular solids uniformly heated to a relatively high temperature, e.g. 1500° F., is first formed. The acid sludge is then distributed initially only over the top surface of said bed and is not intimately mixed with the major proportion of solids until sometime later after foaming has subsided. Even when successful, such procedure obviously draws out the processing time considerably and requires the handling of a relatively large amount of solids in order to process a given quantity of sludge, since only the upper surface of the solids bed is used initially.

In a later patent, namely U.S. 2,395,503, Ross et al. disclose an entirely different procedure for preventing foaming. These patentees propose to mix the sludge with the solid carrier in a preliminary step which is carried out entirely separately from the decomposition phase, care being taken to limit temperatures in said mixing step to a level below the decomposition range for the sludge in question. However, this procedure not only tends to lengthen the process considerably but also restricts the initial temperature of the solid carrier to a relatively low level, e.g. about 500° F., and therefore necessitates indirect transfer of most of the heat supplied and reduces the overall heating efficiency of the process, particularly for the case where solid carrier is recycled.

It is the principal object of this invention to provide a simpler, faster and more efficient process for conducting the decomposition of an acid sludge in the presence of a solid carrier without encountering interference due to foaming and frothing of the sludge, or caking and sintering of the carrier. It is a further object to provide such a process which is better adapted to continuous operation and high production rates than conventional processes which it is designed to replace.

Another object of this invention is to provide a single step process for accomplishing the above results. Still another object is to make more efficient use of the carrier employed so that relatively lesser amounts of solids need to be handled than in previous processes. Still another object is to maintain highest possible heat efficiencies by avoiding the use of excessively high temperatures at any point in the process and by minimizing differences between inlet and outlet temperatures of the solid carrier which is recycled.

Still other objects and advantages of this invention will be apparent from the detailed description and explanation which follows.

According to my invention the above objects and advantages are obtained by spraying the sludge at a temperature high enough to render it sufficiently fluid to be easily atomized but not as high as its decomposition point uniformly onto the surface of finely divided particles of a porous solid carrier, which are falling freely in the form of a thin vertical sheet, at a rate at which it is substantially completely soaked up by said solids, the temperature of said solids being at least sufficiently above the decomposition point of said sludge to supply substantially all of the heat needed to bring the sludge, with perfect heat interchange, to its decomposition point. Since the solid carrier feed rate is generally at least several fold by weight that of the liquid sludge, the heat capacity of the solid stream is never more than slightly less than that of the liquid stream. Therefore, the maximum inlet solids temperature needed is usually no further above the sludge decomposition point than the inlet sludge temperature is below said decomposition point. Since most oily acid sludges decompose at temperatures between about 350 and 600° F. and the inlet sludge temperature is generally in the range of 100 to 200° F., the maximum solids inlet temperature ever needed in my process is of the order of 1100° F. Although slightly higher solids inlet temperatures can be used if desired, for reasons of maximum heat economy I prefer to limit solids inlet temperatures to the range from about 500° to about 1200° F. and find that for most sludges and solids to liquids ratios the temperature of the entering solids is between 600 and 1100° F.

In some cases at high solids to liquid ratios, substantially all of the heat needed for complete decomposition of the acid sludge can be supplied by a solid carrier which is introduced at temperatures such as those mentioned above. However, in most cases this is not practical and additional heat must be supplied to the falling sludge-carrier mixture in order to accomplish substantially complete decomposition of the sludge as it continues its fall. Preferably, this is accomplished in such a way as to avoid dilution or contamination of the gaseous decomposition products i.e. by indirect heating such as, for example, by radiation from high temperature panels or faces on either side of, and parallel to, the vertical sheet of falling particles.

The gaseous decomposition products are collected and processed further to recover $SO_2$ and/or other sulfur values such as $SO_3$, $H_2S$ etc. Meanwhile, the solid carrier, still quite hot at the completion of its fall, is also collected. Although said carrier is usually coated with coke formed during the sludge decomposition process, such coke is well suited to serve as the solid carrier in my process. Since the outlet temperature of this solid carrier is generally close to the level needed for the inlet solid in my process, recycling and reuse of the carrier solids is highly recommended in my process. Of course, such carrier solids can be cooled or heated slightly before reuse in any manner desired, but the need for such temperature adjustments is reduced to a minimum by my invention.

In order to afford a clearer understanding of certain details of my invention, a specific example of its operation to recover sulfur values from a representative petroleum acid sludge will now be described in conjunction with the attached drawing, which is a diagrammatic side elevation, partly in section, of equipment involved.

In this example the acid sludge to be decomposed contains about 60% $H_2SO_4$ by weight and has an active decomposition point at atmospheric pressure of about 400° F. A granular coke, substantially all the particles of which will pass through a 4 mesh (Tyler) screen, is used as the solid carrier. This coke heated to about 900° F. is fed from a hopper 10 by means of a vibrating feeder 12 in the form of a thin vertical stream about 3 feet wide and about 2 inches thick with a flow rate of about 1000 lbs./min. The stream of coke thus formed is introduced in free fall about half way between the two parallel opposed wide faces of an indirectly heated slot kiln 14. The acid sludge is heated to about 150° F. and is then sprayed uniformly over the falling stream of coke by means of opposed flat jet or fan type spray nozzles 16 discharging at right angles to said falling stream of coke from positions in said wide faces of the slot kiln near the top of same. The total sludge feed rate is about 100 lbs./min.

Decomposition of the sludge begins almost instantly on contacting the coke. Heat to sustain and complete the decomposition is supplied by means of gas-air burners 18 located within the checkerwork of walls of said kiln and by combustion products from said burners circulating through flues 20. Product gases are collected from the top of the kiln through stack 22 at the rate of about 300 cu. ft./min. (SCTP) containing about 65% by volume $SO_2$ plus $SO_3$. This represents nearly 90% recovery of the sulfur values present in the sludge as charged, which is exceptionally high particularly considering that the entire process is conducted in a single operation which lasts only for the few (1 to 10) seconds it takes the stream of coke to fall through the slot.

The coke collected at the bottom of the kiln is still in a porous granular condition and still about 900 to 1000° F. in temperature so that it is quite satisfactory for reuse. For example, it, or any part thereof, can be recycled directly to the start of the process by means of elevator 24 or other suitable solids handling system.

The advantages of the above process over those previously disclosed is at once apparent since foaming and sintering difficulties have been avoided not only without lengthening the processing time but actually with a reduction in the processing cycle and a significant simplification of the overall process. An additional unexpected advantage of the present process is that the decomposition takes place so fast that in many cases an appreciable part of the sulfur values are recovered as $SO_3$ rather than $SO_2$. The use of high carrier inlet temperatures and high carrier to sludge ratios seems to favor this result. However, carrier to sludge ratios from about 4 to 1 to about 20 to 1 or even higher can be used in place of the 10 to 1 ratio employed in the above example.

It should be understood that the above example is given only for purposes of illustration and no limiting conditions as to the scope of this invention should be assumed therefrom. Thus, other types of acid sludges may be used with $H_2SO_4$ concentrations varying from about 30 to about 90% by weight. In place of coke any other porous granular solid such as silicas, aluminas and diatomaceous earth may be used as the solid carrier.

Having described my invention and preferred embodiments thereof, what I claim and desire to secure by U.S. Letters Patent is:

1. A continuous process for recovering sulfur values from an oily sulfuric acid sludge comprising flowing finely divided hot particles of a porous solid carrier in the form of a thin vertical sheet of freely falling material downwardly through the space between the flat opposed externally-heated faces of an elongated vertical shaft, spraying uniformly over said freely falling hot carrier particles at a rate such that it is substantially completely soaked up and held by said carrier particles the oily acid sludge heated to a temperature which is below its decomposition point but at which it is sufficiently fluid to enable it to be sprayed, the initial temperature of said hot carrier particles being sufficient to raise the temperature of said sludge, upon complete and perfect heat interchange therewith, to at least its incipient decomposition point but insufficient to decompose same completely, then, decomposing said sludge from the surface of said freely falling carrier particles with the aid of additional heat transferred from the externally-heated faces of the shaft, and finally collecting coked residual solid particles from the bottom of said shaft and gaseous products including sulfur containing gases from the upper part of said shaft.

2. The process of claim 1 in which the temperature of the entering sludge is in the range of 100 to 200° F. and the carrier feed rate is between about four and twenty times by weight that of the sludge, the temperature of the entering carrier being adjusted to a value within the range of about 500 to about 1200° F. in generally inverse relationship to the particular value of its feed rate relative to the sludge feed rate.

3. A continuous process for recovering sulfur values from a fluid sulfuric acid sludge comprising spraying said sludge uniformly over the surface of a vertically falling flat sheet of freely falling discrete granules of a hot porous solid residue recycled from previous operation of this same process, the temperature of said granules being sufficient to raise the temperature of the sludge to at least its incipient decomposition point but insufficient to complete its decomposition upon undergoing complete heat interchange therewith, further heating the resultant sludge-bearing granules by radiant indirect heat transfer so as to effect substantially complete decomposition of said sludge, continuously recovering gaseous decomposition products including sulfur oxides and continuously collecting hot granular solid residue and recycling same to the beginning of the process.

4. The process of claim 3 in which the discrete granules forming said vertically falling flat sheet are substantially all smaller than 4 mesh in the standard Tyler screen series.

5. The process of claim 3 in which the temperature of the sprayed sludge is in the range of 100 to 200° F. and the temperature of the recycled solid residue is in the range of about 500 to 1200° F. at both the beginning and the end of the process.

References Cited in the file of this patent

UNITED STATES PATENTS

| | | |
|---|---|---|
| 2,336,466 | Chatterton et al. | Dec. 14, 1943 |
| 2,412,667 | Arveson | Dec. 17, 1946 |
| 2,467,855 | Read | Apr. 19, 1949 |
| 2,701,181 | Kilpatrick | Feb. 1, 1955 |